United States Patent [19]

Van der Beck et al.

[11] 4,162,826
[45] Jul. 31, 1979

[54] SIGHT GLASS ASSEMBLY AND METHOD FOR ITS PRODUCTION

[75] Inventors: Roland R. Van der Beck, Pittsford; James W. Chapman, Penfield, both of N.Y.

[73] Assignee: Sybron Corporation, Rochester, N.Y.

[21] Appl. No.: 888,076

[22] Filed: Mar. 20, 1978

[51] Int. Cl.² ............................................. C03C 27/02
[52] U.S. Cl. ........................................ 350/319; 65/43; 65/59 R; 351/154; 73/325
[58] Field of Search ................. 65/42, 43, 59 R, 59 A; 350/319; 351/154; 73/325, 326

[56] References Cited
U.S. PATENT DOCUMENTS

| | | | |
|---|---|---|---|
| 1,695,830 | 12/1928 | Thurneyssen | 65/43 X |
| 2,946,156 | 7/1960 | Bailey | 65/43 X |

OTHER PUBLICATIONS

Hermaseal Co. Brochure filed by Applicant, untitled, showing various glass to metal and other seals offered by the Company-Received Jun. 5, 1978.

Primary Examiner—Arthur D. Kellogg
Attorney, Agent, or Firm—Theodore B. Roessel; James A. Rich

[57] ABSTRACT

A high impact sight glass assembly and production method are described, in which the glass lens is fused into an enamel coated metal ring such that the glass lens is fused to the enamel coating and the entire glass area is under compression. The glass lens is placed in the bore of a flange, and the lens and flange ring are heated, whereby the lens flows to conform to the bore of the flange and is fused to the enamel coating.

5 Claims, 4 Drawing Figures

SIGHT GLASS ASSEMBLY AND METHOD FOR ITS PRODUCTION

BACKGROUND OF THE INVENTION

The present invention relates to a sight glass assembly suitable for use with a large vessel containing fluid under pressure. The fluid may be corrosive and/or at a high temperature.

Many prior art sight glasses consist of a single piece of glass of suitable composition supported in a mounting assembly including flange rings which are clamped against the outer and inner surfaces of the sight glass through manual tightening of flange bolts to seal the mounting assembly against leakage of pressure or vacuum. To insure a perfect seal the flange bolts are tightened which in turn cause uneven stresses in the glass lens. Another type of sight glass commonly in use with vessels containing fluids under pressure and at a high temperature consist of a single piece of glass of suitable composition mounted in the wall of said vessel in a suitable holder. Even though the composition and geometry of the glass selected resists the normal stresses caused by operating pressure and temperature it does not offer protection against the abnormal stresses produced by corrosion, impact, thermal shock, and lens scratches.

Another type of sight glass commonly available uses tempered glass lens. A tempered glass consists of an inner tensile layer and a thin outer compressive layer. This increases the strength of the glass and correspondingly increases its ability to withstand internal pressure, provided the thin compressive layer is not damaged by chemical corrosion or by scratches. If this occurs, the glass is actually weaker than an untempered piece since the undamaged glass is already in tension.

SUMMARY OF THE INVENTION

An object of the present invention therefore is to provide a sight glass assembly which resists normal and abnormal stresses.

Another object of the invention is to provide a sight glass assembly of one piece construction achieved by the fusion of a pressure lens directly to an enamel coated steel ring.

Yet another object of the invention is to provide a sight glass assembly having substantial strength plus outstanding resistance to impact.

Yet another object of the invention is to provide a sight glass assembly having long term service life due to the reserve strength inherent in it because of its one piece structure.

Still another object of the invention is to provide a maintenance free sight glass assembly which is devoid of any resilient packing material between the lens and the streel ring.

Still another object of the invention is to provide a one piece construction sight glass assembly where the entire glass area is under uniform compression within the steel ring thus providing outstanding resistance to impact, cracking and thermal shock.

In accordance with the present invention a sight glass assembly is provided wherein the glass lens is compressed by being fused into an enameled steel ring.

Other objects, advantages and capabilities of the present invention will become apparent from the following detailed description taken in conjunction with the accompanying drawings illustrating preferred embodiments of the invention.

DRAWINGS

DETAILED DESCRIPTION

Figure 1:
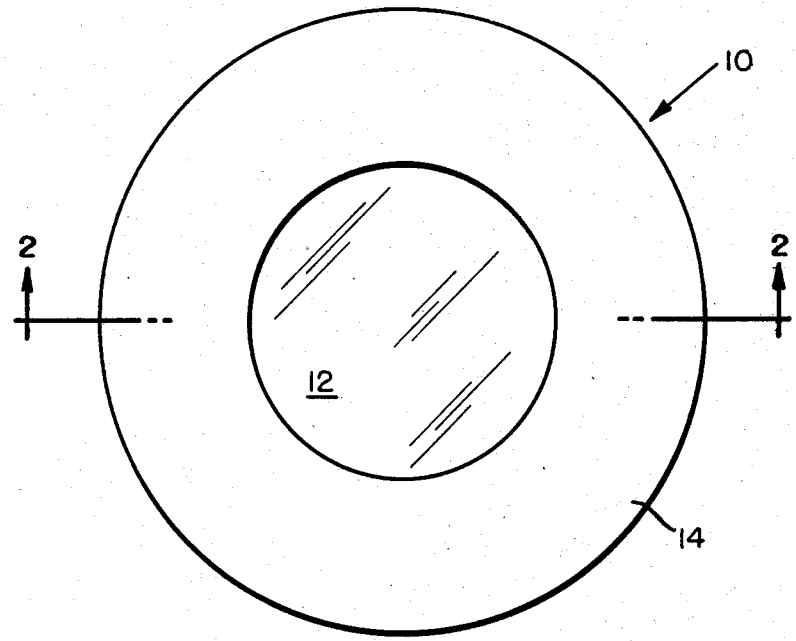
FIG. 1 is an elevational view of a sight glass assembly.
Figure 2:
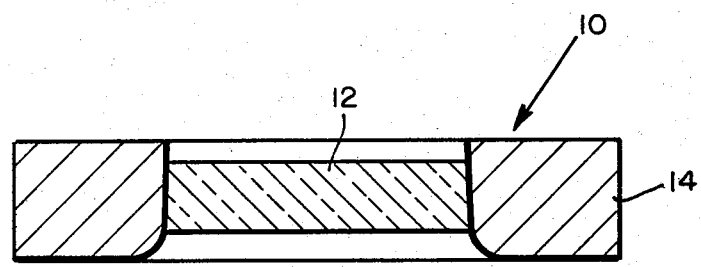
FIG. 2 is a section view taken along the line 2—2 of FIG. 1.

Referring to the drawings wherein like reference characters designate corresponding parts throughout the several figures and particularly the FIGS. 1 and 2 the reference character 10 indicates generally the sight glass assembly of the type embodying the present invention which includes the sight glass 12 fused in an enameled flange ring 14. The flange ring which has a 2° taper at the bore to facilitate the assembly is coated with a chemical resistant glass enamel. The impact resistance of the sight glass may be further enhanced by sealing a high impact lens on the side exposed to the atmosphere.

Figure 3:
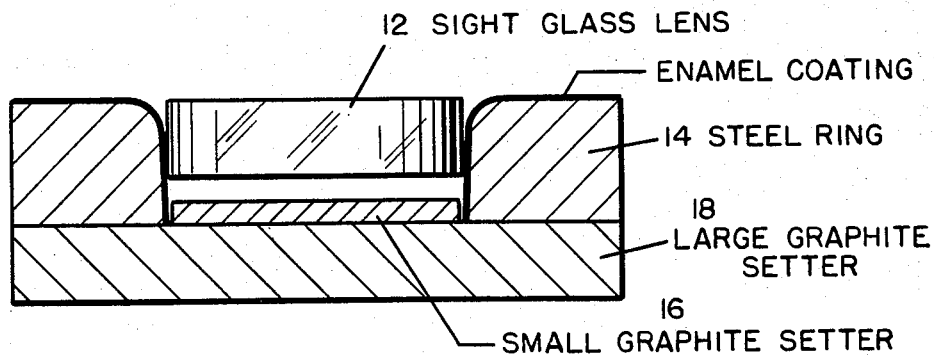
FIG. 3 shows sight glass assembly before insertion into a furnace.

The detailed procedure of manufacturing the sight glass assembly is as follows:

A small graphite setter plate 16, ring 14, lens 12 and large graphite setter 18 are cold assembled as shown in FIG. 3. The small graphite setter is slightly smaller in diameter than the bore of the ring, the surface of ring 14 is enameled and one side of the ring preferably has a 2° taper at the bore. The glass lens diameter is slightly larger than the bore of the ring. The graphite setters are used to help mold the assembly, though any other substrate material having dimensional stability as well as the property of non-adhesion to molten glass at a higher temperature, may be used.

Figure 4:
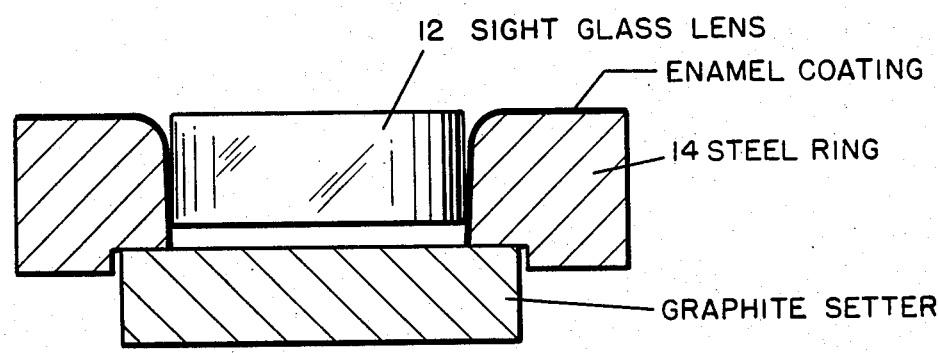
FIG. 4 shows high impact sight glass assembly before insertion into a furnace.

The cold assembly as shown in FIG. 4 is inserted in a preheated dual zone electrically heated atmospheric box furnace. The temperature maintained is the flow point temperature of lens material selected. In this embodiment soda lime glass was chosen as the lens material and a temperature of approximately 1600° F. was maintained. The proper sealing time is about 5 minutes after the rings reach furnace temperature. At the flow point temperature the viscosity of soda lime glass is in the range of $10^5$ poise. The glass lens softens and flows into the bore and bonds to the softened enamel coating on the inside surface of the bore, which has a viscosity in the range of $10^2$ poise at that temperature.

The door between the furnace zones is then raised and the hot sight glasses are simply pushed through into the 400° F. cooling chamber.

The sight glass is removed from the furnace when the indicated temperature is approximately 600° F. or less and is allowed to cool to room temperature. A second holding oven may be used if the time to reach approximately 600° F. is excessive. This oven should be at approximately 600° F. and parts removed from the cooling chamber allowed to soak for at least 1 hour so that the approximately 600° F. temperature is attained. After the parts cool to room temperature, the graphite insert is normally embedded in the ring. This is easily removed by simply scoring the graphite with a sharp knife.

The sight glasses are then tested.

The materials that are utilized to produce the basic Fused-Steel Sight Glass include conventional titanium stabilized steel, an enamel coating, an annealed soda-lime plate glass disc, and a high density graphite setter. The Ti-stabilized steel was selected for ease of glassing and availability as a stock material in the desired thickness. Other materials such as Inconel or Incoloy metals or glassable carbon steels could also be used. The soda-lime plate glass was selected for the lens material due to its availability, low cost and proper thermal expansion mismatch with steel in that the expansion of steel is greater than that of glass. The glass lens must be properly annealed to prevent breakage during sealing and must have the minimum bevel necessary to prevent handling problems. The enamel coating selected for the ring surface was such that its favorable expansion match with the metal would permit coating over the radius. It was however found necessary to increase the mill addition $SiO_2$ content of the enamel coating to prevent the coating from thinning on the radius during sealing. Addition of silica changes the viscosity of the enamel. Thus under heat the enamel softens but does not flow and the softened lens falls into a graphite setter and flows to conform to the expanded ring and fuses with the enamel coating. The structural graphite setter must be a high density material such that it can be machined flat. It is apparent that materials other than those used could be employed to produce technically equivalent sight glasses providing the properties of the materials are appropriate and proper design considerations are followed. Of particular importance are the relative thicknesses and areas of the glass and the steel as well as the thermal expansion mismatch between the two materials.

The dual-zone electric furnace with atmosphere capability proved to be ideal in producing sight glasses. It is felt that other furnaces can be utilized to produce the sight glasses provided adequate temperature uniformity to achieve complete sealing is maintained.

The ability to make sight glasses is somewhat dependent on proper dimensional control of the coated ring opening, the glass lens diameter and the diameter of the graphite setter. The glass lens should, during cold assembly, neither pass through nor sit appreciably above (i.e., 1/32") the ring surface. If the glass passes through the ring the time required for the glass to flow to the ring will become excessively long while if the lens sits significantly above the ring surface the lens tends not to seat on the graphite prior to becoming somewhat fluid and sagging to such a degree that the top lens surface is distorted after sealing. The relationship between the ring opening and the diameter of the setter is also important. The diameter of the thin graphite setter should be within 50 mils of the coated inside diameter of the encasing ring. It can of course be as close to the inside diameter of the ring as practical. A starting diameter difference greater than 50 mils, however, will present a problem in that the clear lens glass will flow into the gap during sealing and will later have a tendency to chip and spall. Although it sounds somewhat complicated to achieve the desired balance of dimensions, it has, in practice presented no major difficulties. The glass diameter is specified, the graphite diameter is then specified to be 50 mils smaller than the glass, and the minimum inside ring diameter is then machined so that 40 mils of coating will produce a ring diameter equal to the glass diameter. If this logical sequence of steps is followed, any size sight glass can be produced without problems.

The invention is further modified to make a sight glass assembly having a higher impact resistance by sealing a lens on one side of the sight glass assembly.

The same constraints as in the heretofore described sight glass assembly are applicable to the high impact sight glass with the exception of the graphite setter. In this case the graphite setter is thicker than the ring recess and will have a diameter such that it will fit into the recess area.

Figure 5:
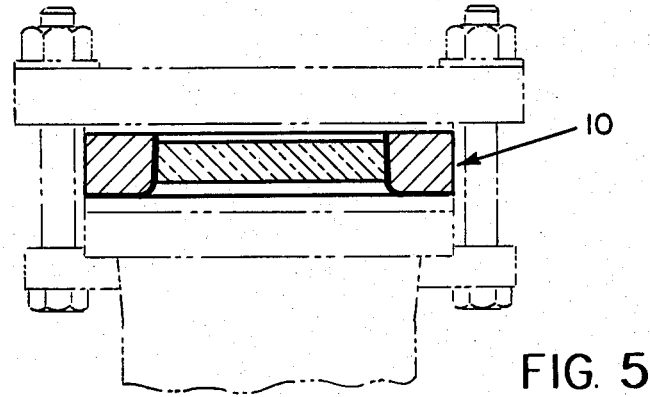
FIG. 5 shows the sight glass assembly as installed on an operating vessel.

The parts are cold assembled as shown in FIG. 5. The 2° taper is again simply to facilitate cold assembly.

The cold assembled parts are then inserted in the preheated furnace. The proper sequence of events in the sealing operation are as follows:

1. The ring expands faster than the glass and the glass falls onto the graphite setter. With proper control of dimensions this occurs before either the glass lens or enamel coating on the ring softens.

2. The lens becomes fluid and flows to conform to ring geometry and seal to the enamel coating.

The sealed parts are then moved to the cooling chamber and allowed to cool slowly to below at least 600° F. and preferably to below 400° F. before removal to air cooling. This cooling should occur over at least a 90-minute period. Although parts have been produced by rapid cooling in air, it is felt that a more uniform and reliable product is produced by slow cooling.

After the parts are thoroughly cooled the supported glass surface is polished to visual clarity. The bare surfaces are then cleaned by belt sanding, etc. prior to painting. It is felt that the ring surface should be flat to insure uniform stress distribution during mounting. A corrosion resistant and decorative paint, is then applied in a normal manner. Care should be taken to insure uniform and adequate coverage since excessive corrosion near the lens area is detrimental. The impact shield and gasket are then installed in the high impact sight glass by using a silicone sealer. The impact shield is preferably made out of tempered soda lime glass. It protects the sight glass from any mechanical abuse from outside and acts as a safety shield for the glass lens. The completed sight glass assembly is installed on a nozzle of an operating vessel as shown in FIG. 5. The assembly is bolted to the nozzle with gaskets in between. In the case of the high impact sight glass assembly the impact resistant shield is exposed to the atmosphere.

Thus, it should be appreciated that the sight glass assembly of this invention is a unique one piece construction, achieved by the fusion of a pressure lens directly to an enamel coated glass steel ring, has substantial strength plus outstanding resistance to impact. The fused steel sight glass has been tested to have a safety factor of at least 20 times rated pressure before leakage occurs, and at least 10 times rated pressure (at rated temperature) before stress cracks appear. These outstanding properties are achieved because the glass is placed under a high degree of uniform compression as a result of the differential contraction between it and of the metal member. As a result, it is resistant to thermal or mechanical shock. Since a glass will not break under compression, the outer metal member could be made from ordinary steel, a corrosion resistant alloy or glass lined steel. The clear glass component may be a corrosion resistant borosilicate glass, plate glass etc. The selected glass should have the proper thermal expansion mismatch with the flange ring metal so that the expansion of the metal is greater than that of glass.

We claim:

1. A sight glass assembly comprising a lens of soda-lime plate glass mounted in and compressed by an enamelled steel, Inconel or Incolloy metal ring having a wall thickness at least equal to 0.3 times the diameter of said lens, said metal ring having an enamel coating, and said lens being fused to said coating.

2. A method of making a sight glass assembly comprising:
   (a) placing a non-adhesive substrate setter within a bore of a steel, Inconel or Incolloy metal ring having a wall thickness at least equal to 0.3 times the inside diameter of the ring and having an enamel coating
   (b) placing a soda-lime plate glass lens in the bore of said enameled ring;
   (c) heating the substrate, the metal ring and the glass lens so arranged to the flowpoint temperature of said lens so that said ring expands and said lens conforms to the bore of said ring and is fused to said enamel coating;
   (d) and cooling said ring and said lens to compress said glass lens within said enameled ring.

3. Method of claim 2 wherein the glass lens initially is longer in diameter than the bore of the ring.

4. Method of claim 2 wherein the heating temperature employed is approximately 1600° F.

5. Method of claim 2 wherein the enameled metal ring is placed on a non-adhesive substrate.